Nov. 18, 1969         J. L. MEDEIROS         3,478,674

OVEN FOR COOKING FOOD USING COALS AND STORED HEAT

Filed Aug. 10, 1967         4 Sheets-Sheet 1

INVENTOR.
JOE LEWIS MEDEIROS
BY
ATTORNEYS

Nov. 18, 1969  J. L. MEDEIROS  3,478,674
OVEN FOR COOKING FOOD USING COALS AND STORED HEAT
Filed Aug. 10, 1967  4 Sheets-Sheet 2

INVENTOR.
JOE LEWIS MEDEIROS
BY
ATTORNEYS

Nov. 18, 1969   J. L. MEDEIROS   3,478,674
OVEN FOR COOKING FOOD USING COALS AND STORED HEAT
Filed Aug. 10, 1967   4 Sheets-Sheet 3
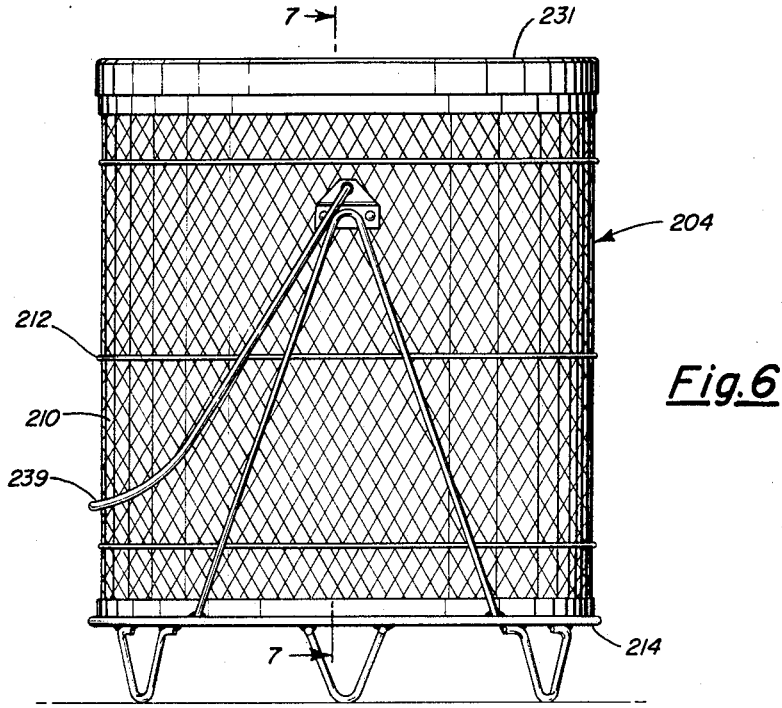
Fig.6
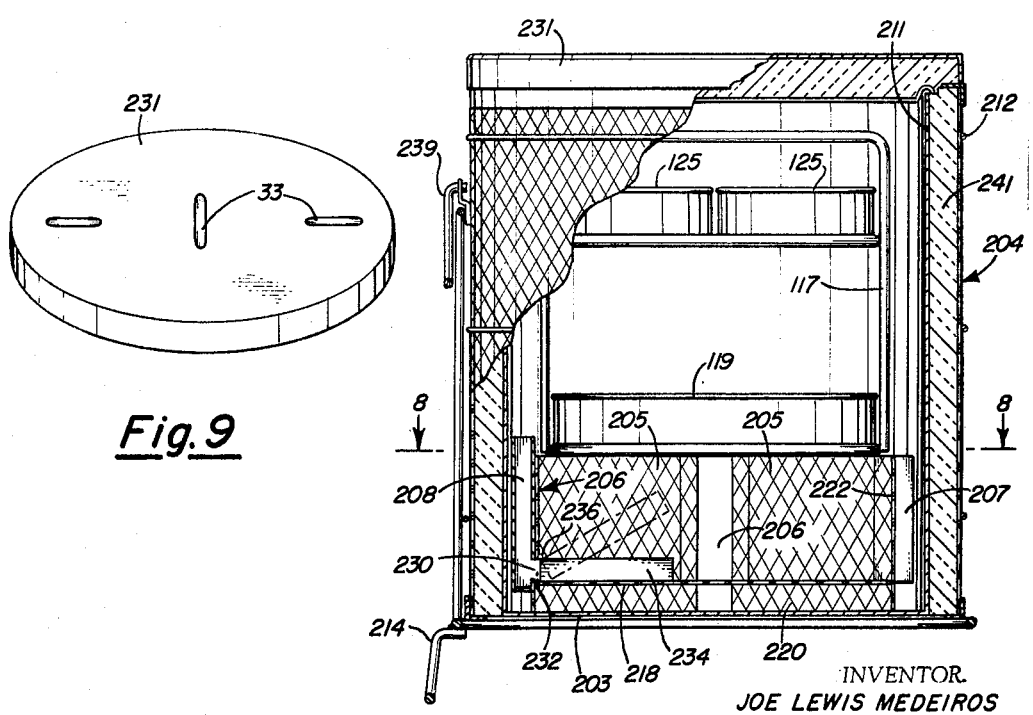
Fig.9
Fig.7
INVENTOR.
JOE LEWIS MEDEIROS
BY
ATTORNEYS

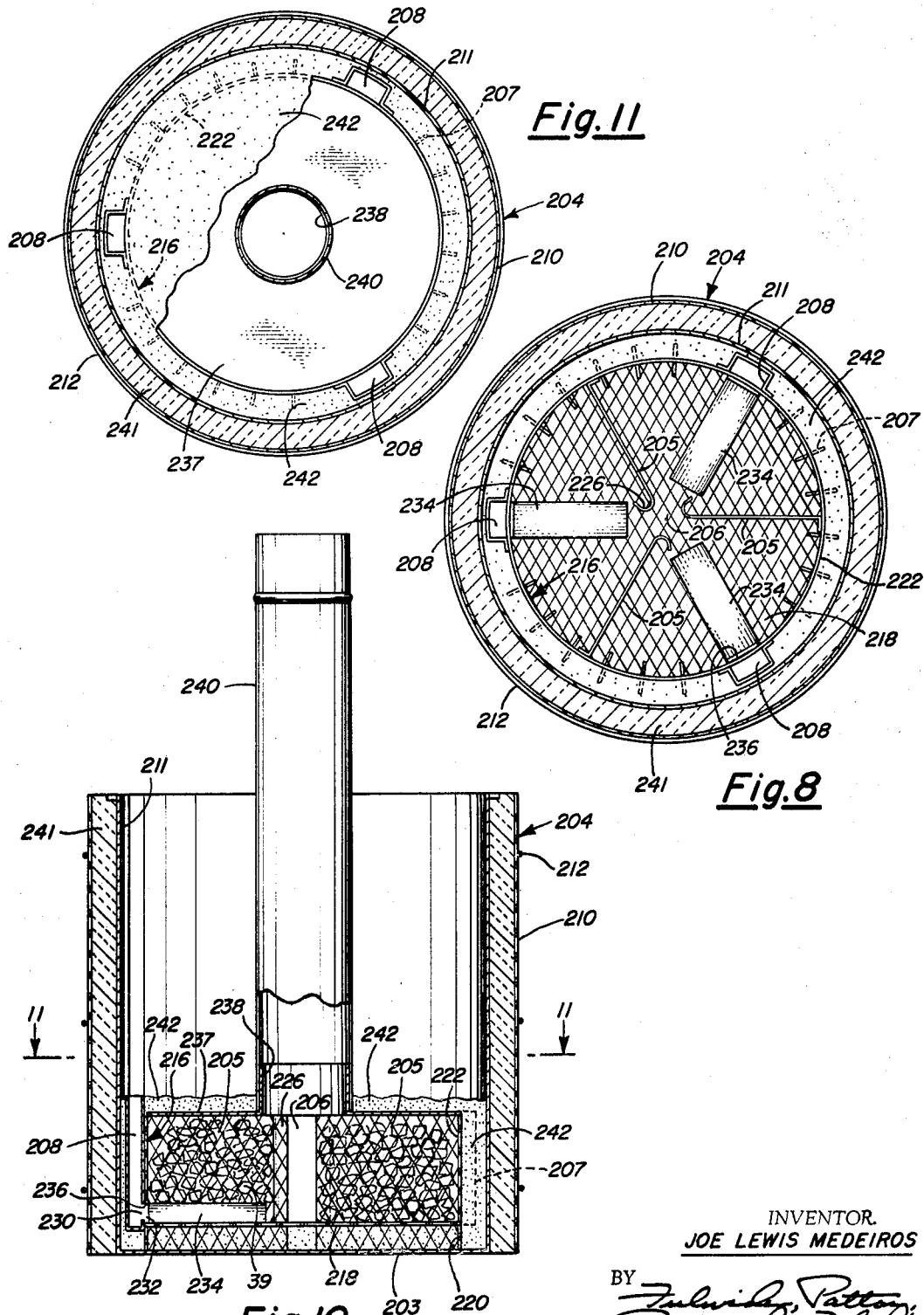

United States Patent Office 3,478,674
Patented Nov. 18, 1969

3,478,674
OVEN FOR COOKING FOOD USING COALS AND STORED HEAT
Joe Lewis Medeiros, 6694 San Miguel,
Lemon Grove, Calif. 92045
Continuation-in-part of application Ser. No. 622,864,
Feb. 8, 1967. This application Aug. 10, 1967, Ser.
No. 659,760
Int. Cl. A47j 37/01, 27/00
U.S. Cl. 99—347                               19 Claims

ABSTRACT OF THE DISCLOSURE

Apparatus for cooking employing an oven. A solid fuel, such as coke, charcoal or wood is burned to create hot coals. The heat is introduced into and stored in a heat absorbing material such as sand or ground. Thereafter, the food in a container is subjected to the stored heat, the container being completely covered. Drippings from the food are prevented from entering the hot coals. The fuel may be burned in a hole in the ground and after the container with the food therein is placed above the hot coals, the entire container is covered with ground. Or, the oven may be of the portable and insulated type and receives sand which functions also as the heat absorbing material.

---

The present application is a continuation-in-part of my co-pending application Ser. No. 622,864, filed Feb. 8, 1967, which is a continuation-in-part of application Ser. No. 577,308, filed Sept. 6, 1966, now abandoned.

The apparatuses are herein disclosed in several embodiments of the invention.

The apparatus is used for burning a solid fuel such as coke, charcoal or wood to be brought into hot beds of coals. The heat generated is conducted to and stored in heat absorbing material. After the coals are heated and the heat absorbing material has stored sufficient heat, food is lowered into heat exchange relationship with the coals and the heat absorbing material and cooking is accomplished. The flow of oxygen to the coals is limited by covering the container. A pan is provided for preventing the juices of the food from falling into the hot coals to alleviate the effect of having the juices, which are cooler than the coals, from cooling the coals, and for preventing undesirable burning of the juices such as the drippings from meat.

In one embodiment of the invention, a hole is dug in the ground or in the soil in a large tube or large planter box. The fuel is brought to a hot coals condition and then an open bottom container with the food therein is lowered into the hole with the food spaced above the coals. And thereafter, the container is encased completely with the soil.

In another embodiment of the invention, the container is provided with a bottom for supporting the fuel. The container is lowered into the hole in the soil, and, after the fuel is in a hot coal condition, the food is lowered into the container. Thereafter, the container is encased completely in the soil.

In another embodiment, the oven is portable, the container is in the form of a liner which is spaced from and surrounded by an outer casing. Heat absorbing material is disposed between the lining and the casing. A hearth is disposed in the bottom of and spaced from the liner, and this space contains heat absorbing material, preferably the loose type such as sand. At least one downdraft tube is disposed in this space. An updraft tube is also provided. Also fins extend outwardly of the hearth and into the sand.

Other features and the advantages of the present invention will be apparent from the following description, reference being had to the accompanying drawings wherein preferred embodiments of the invention are illustrated.

In the drawings:

FIG. 6 is a side view of still another embodiment of the invention, showing the oven resting on a stand;

FIG. 7 is a view partly in section, the section being taken along line 7—7 of FIG. 6, the food carrier being in the position it assumes during cooking operation;

FIG. 8 is a sectional view taken along line 8—8 of FIG. 7;

FIG. 9 is a perspective view of the cover of the oven;

FIG. 10 is a sectional view taken along line 7—7 of FIG. 6, but showing the oven in its heating phase wherein loose heat absorbing material surrounds and covers the hearth, and showing a removal updraft tube in position; and FIG. 11 is a sectional view taken along line 11—11 of FIG. 10, but showing part of the loose heat absorbing material removed to show a part of the top of the removable cover plate for the hearth.

Figure 1:
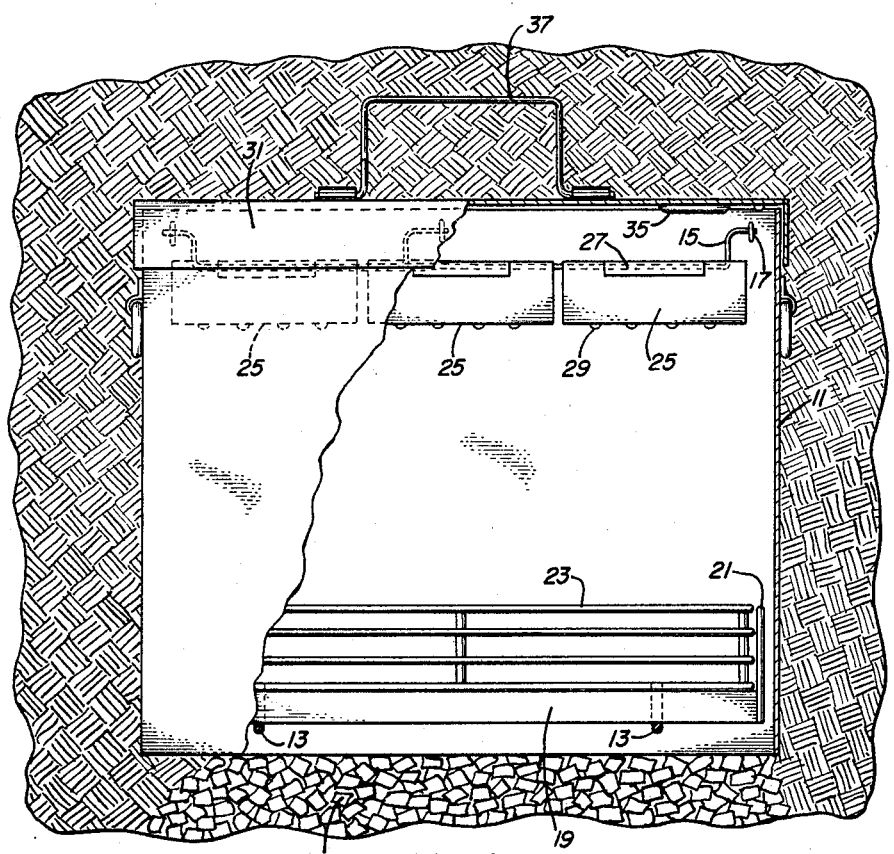
FIG. 1 is a side view of one embodiment of the invention, partially in section, the oven being shown covered with ground.
Figure 2:
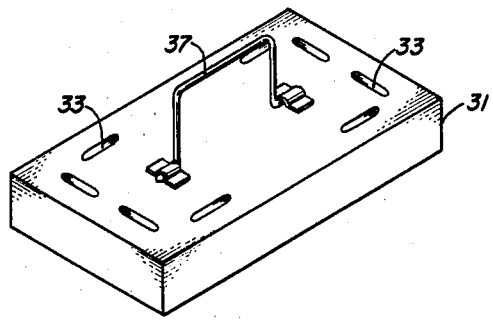
FIG. 2 is a perspective view of the cover included in the oven shown in FIG. 1.

Referring more in detail to the drawings depicting the embodiment shown in FIGS. 1 and 2, the oven includes a container 11 that is open on the top and bottom. Supports 13 are provided in the bottom of the oven. Wire hangers 15 are supported pivotally at 17 and are adapted to be swung out of supporting position. A juice pan 19, formed of stainless steel, is placed on the supports 13.

An open bottom shelf 23, formed of stainless steel wires, is provided for supporting food, such as meat, to be cooked and is adapted to rest on the top of the juice pan 19.

Auxiliary trays 25 are provided for cooking side dishes of food, such as beans. The auxiliary trays 25 include handles 27 that engage the hangers 15 to support the trays in the upper portion of the container 11.

Dimples 29 are included in the bottom of the trays 25 to provide surface irregularities on the bottom of the trays for inducing concentration of moisture condensation. These dimples are disposed so that the drippings fall onto the food on shelf 23. A cover 31 is provided for covering the container 11. The cover includes leveling tubes 33 that can be seen from the top of the cover 31 for determining when the oven is level. The leveling tubes 33 are disposed in depressions in the cover and the underside of these depressions form downwardly extending protruding sections 35 in the cover 31. Thus, means is provided for inducing concentration of condensing moisture above the open top auxiliary trays 25 and directly above the food on the trays. A handle 37 is pivotally attached to the top of the cover 31. The handle 37 is formed such that when it is in the raised position, it serves as a depth gauge for assuring that the underground oven is covered with the proper amount of soil.

From the foregoing, it will be clear that when it is desirable to cook in the underground oven, a hole will be dug in the earth and the solid fuel will be burned therein to form hot coals 39. The juice pan 19 is placed on the supports 13 and the food shelf 23 is placed on the juice pan. The food such as meat, to be cooked is then placed in the pan 19 or on the shelf 23. The auxiliary tray hangers 15 are then moved to the lowered position and the auxiliary trays 25 with food thereon, are supported therefrom. The cover 31 is then placed in position and thereafter, the oven with the food therein is lowered into the hole. Thereatfer, the leveling tubes 33 are checked to assure that the oven is level. With the cover handle 37 in the raised position, the oven is sufficiently covered with soil 41 whereby the container forms a closed chamber. The oven surrounding ground will thus serve as an excellent thermal insulator and also to seal the oven to provide a pressure cooker effect.

As the food is cooked, moisture evaporates therefrom and condenses on the auxiliary tray dimples 29 and on the cover 31, protrusion sections 35 and drips therefrom onto the meat and into the trays 25, respectively, thus keeping the cooking food moist and basted.

The juices generated in the tray 23, from the meat, will be collected in the pan 19 and will be available for use in preparation of the meal. This also alleviates the undesirable effect of having the juice drip directly into the coals 39 which would cause cooling of the coals. Flaming does not take place after the coals and oven are covered with soil, since insufficient oxygen is supplied to the coals from the earth to support a flame.

Figure 3:
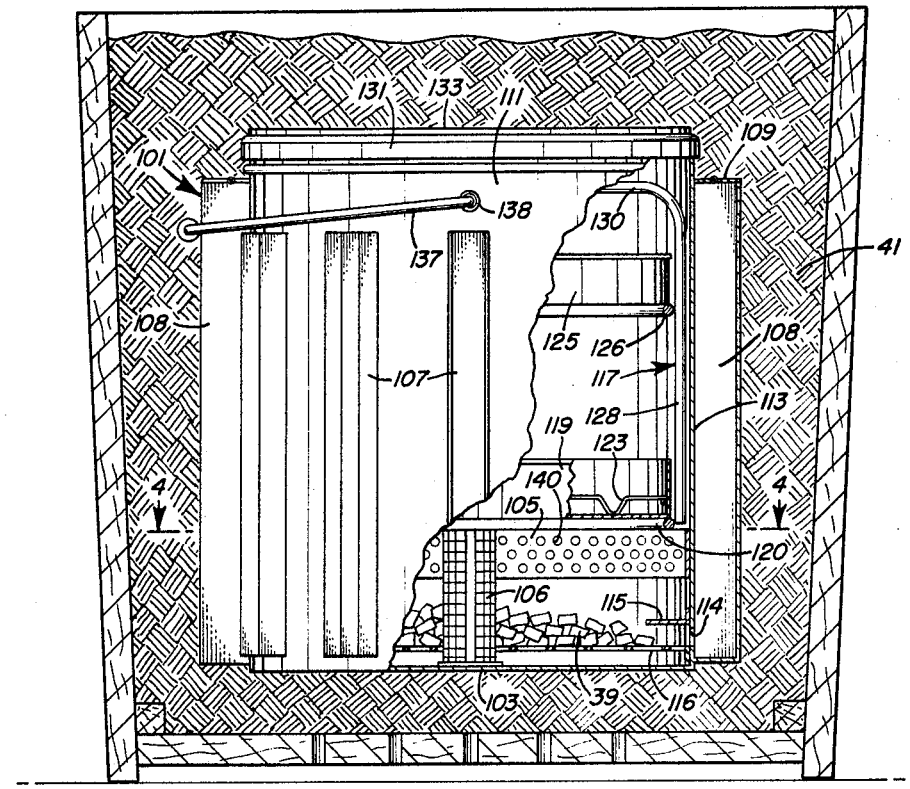
FIG. 3 is a side view, partly in section, of another embodiment of the invention, showing the oven encased in the soil in a planter box, the planter box being shown in section.
Figure 4:
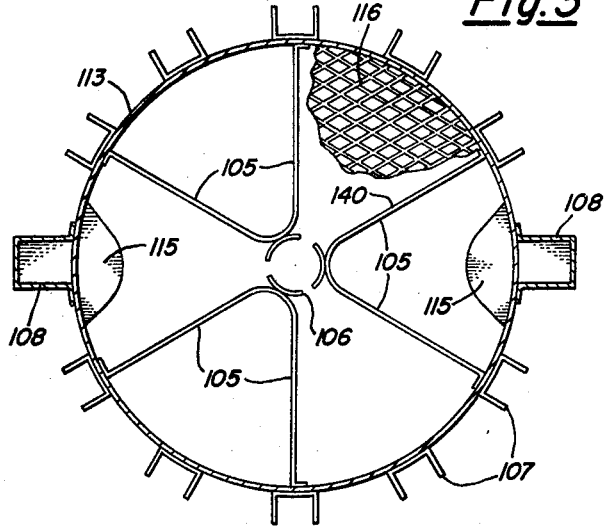
FIG. 4 is a sectional view of the oven, the section being taken along line 4—4 of FIG. 3.
Figure 5:
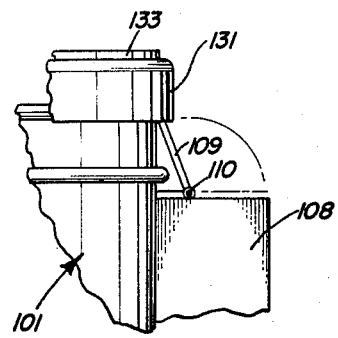
FIG. 5 is a fragmentary view of the upper right corner of the oven showing the cover for the downdraft flue in open position, in which position it lies in the path of downward movement for the cover for the oven.

Referring now to the embodiments shown in FIGS. 3 to 5, the oven 101 includes an open top container 111, having a closed bottom 103. A plurality of inwardly extending metallic fins 105 are suitably secured at their outer ends in intimate heat exchange relation, preferably by welding, to the inside surface of the side wall 113 of the oven. The inner ends of fins 105 are welded to an updraft flue 106. This flue is perforated and rests on the floor or bottom 103 of the oven. A plurality of metal fins 107 are welded to the outer surface of the side wall 113.

One or more down draft flues 108 (preferably two) are welded to the outer surface of the side wall 113. These flues are open at the top and are provided with covers 109 which are hinged at 110. The lower ends of the flues 108 register with and are in open communication with vents 114 at the extreme bottom of the side wall 113. Shields 115 are disposed inwardly from the vents to prevent blocking of the vents by the fuel 39. A removable grate 116 is supported on the bottom of the container.

A cooking vessel support 117, formed of stainless steel rods, is removably supported on the inwardly extending fins 105. Support 117 removably carries a juice pan 119 by a ring 120. The pan 119 carries a wire tray or shelf 123 for supporting food, such as meat. Auxiliary trays 125 are provided for side dishes of food, such as beans. These trays 125 are supported by a ring 126 and cross bars (not shown) on the support 117. Rings 120 and bars are welded to uprights 128 of the support. 117. The yoke 130, which connects with the upper ends of uprights 128, forms a handle for the support 117. Dimples are formed in the bottom of the trays 125 and function as set forth with respect to the dimples 29 in trays 25.

A cover 131 for the container 111 includes leveling tubes for the purpose set forth previously with respect to the embodiment shown in FIG. 1. Like in FIG. 1, the tubes are disposed in depressions for the purpose as set forth with respect to the embodiment shown in FIG. 1. A bale 137 is pivotally attached at 138 to opposite sides of the side wall 113 and forms a handle for the oven.

After a hole is dug in the earth or in the soil in a planter box, the oven 101, sans the cooking vessel support 117 and vessels 119 and 125, is lowered in the hole, with or without the fuel 39 therein. The fuel, after being placed in the bottom of the container 111, is partly saturated by a suitable lighting fuel and then lit by any suitable means, such as dropping a lighted piece of paper upon the fuel.

In actual practice, it was found that if the updraft flue 106 is omitted, one of the down draft flues functioned as such while the other functioned as an updraft flue. This resulted in explosions taking place in the oven. By providing the perforated updraft tube 106, both flues 108 function as intended, namely to supply oxygen to the burning coals through the vents 114, and, explosions were eliminated; the time for bringing of the coals to desirable hot cooking temperature was materially reduced. The fins 105 and 107 materially reduce the time for heating the surrounding soil 41 along the side and bottom of the oven 101. Holes 140 in the fins 105 increase the heat absorbing areas of the fins.

After the fuel reaches the desired temperature, the vessel support 117 with the desired vessels thereon and the desired food therein is lowered into the container 111 in which position the ring 120 rests on the fins 105. Immediately thereafter, the cover 131 is placed in position as shown in FIGS. 9 and 10.

The covers 109 for the down draft flues 108, when in open position as shown in FIG. 5, lie in the path of downward movement of the cover 131 so that the cover 131 cannot be placed in closed position when the flue covers are in open position. After the covers 109 for flues 108 are moved to closed position, and cover 131 is in position, an asbestos pad 133 is placed on cover 131 and then the encasing of the oven is completed by covering the same with soil 41 for the purpose set forth previously with respect to the embodiment shown in FIG. 1.

The fuel employed may be coke, charcoal, wood, or any combination thereof; if wood is employed, hard wood is preferable such as ash, walnut, oak, hickory, lemon, grape stumps, etc.

From the above, it will be apparent that the method and oven provide a simple, effective and economical means for cooking meat and food underground.

Referring now to the embodiment shown in FIGS. 6 to 11, the oven 204 includes an outer casing 210 formed of expanded metal which is held in circular form by a plurality of metallic rings 212. The oven is shown as resting on a stand 214. The container 211 is in the form of a liner which is included by the heat absorbing material 241 of any suitable light weight material which is disposed between the liner and the outer casing. The oven is provided with an insulated cover 231 and a bottom wall 203.

The hearth 216 for the solid fuel 39 includes a centrally disposed circular grate 218 which is supported by and spaced upwardly from the bottom wall 203 by a circular band 220 of expanded metal. The hearth 216 includes also a centrally disposed circular band 222 of heat-withstanding steel, which extends concentrically upward from the grate 218. The earth is divided into three sections by three equally spaced, upwardly and radially disposed webs 205. These webs extend inwardly from the band 222 to adjacent the axis of the grate where they are bent as at 226. These webs 205 are also formed of expanded heat-withstanding metal. Being so formed, they are provided thus with a plurality of openings. The bent portions 226 have the dual functions of providing a perforated updraft flue 206 and prevent the solid fuel from passing into the flue. The hearth 216 is spaced inwardly from the inside of the liner 211.

The hearth 216 is provided with at least one downdraft flue 208; preferably three equally spaced flues are provided. These flues 208 are formed of heat withstanding steel and are welded to the periphery of the hearth band 222. The upper ends of these flues are open and the lower ends are open, as at 230, which opens register with like openings 232 in the band 222. Inverted U-shaped tunnels 234 are hinged at 236 to the interior of the band 222 and extend radially inwardly from the holes 232 to direct air from the downdraft flues 208. These tunnels are formed of expanded sheet metal. They are hinged so that they can be swung upwardly to a vertical position, whereby sand can be placed throughout the bottom. The bottom of the tunnels 234 being open, they can be placed in a horizontal position for the ingress of air into the hearth.

Referring now more specifically to FIG. 10, which shows the oven 204 in its heating phase. Solid fuel 39 can fill the hearth 216 for maximum duration of heating, or lesser amounts can be inserted, depending on the duration of the cooking phase or the type of food to be cooked. During the heating phase, a circular plate 237 is removably carried by the rim of band 222. This plate carries an upwardly extending collar 238 which is vertically aligned with the perforated updraft flue 206. The plate 236 carries an upwardly extending stove pipe 240 which is located by the collar 238. Pipe 240 forms an updraft flue continuation of flue 206. Heat absorbing material 242, such as sand, is added after the plate 237 is placed in position, as shown in FIGS. 10 and 11. This sand encircles the hearth 216 and covers the plate 237. Thereafter the fuel is ignited by dropping a flaming element through the collar 238.

Intense heating takes place shortly after the fuel is ignited, due to the employment of the draft tubes. The length of the heating phase depends upon the amount of solid fuel 39, which is placed in the hearth 216, and, of course, the amount of fuel placed in the hearth is predetermined by the type of food and the quantities of food which is to be cooked. Formulas for such cooking duration for various foods and for various quantities can be formulated. The heat generated is conducted from the hearth 216 to the sand 242, which conduction is enhanced by metal fins 207 which are welded to the periphery of the band 222 and extend into the sand 242. And, heat is conducted from the sand to the heat absorbing material 241 between the liner 211 and outer casing 210. Heat is also conducted to the liner and material 241 through the air above the sand on plate 237.

After the attendant is satisfied as to the heating phase, the pipe 240 is removed from the oven. The plate 237 and the heated sand remains in place.

Then food to be cooked is placed in the proper cooking vessels and placed on the support 117, and then lowered into the liner 211, the support resting on the webs 205. Like in the embodiment shown in FIGS. 3 to 5, the pan 119 functions not only as a container for food to be cooked, but also prevents juices from the food from dripping into the hotter coals. The cooking is performed by the heat of the hot coals and through the heat stored in the sand and in the heat absorbing material 241.

From the foregoing, it will be observed that the method of cooking is the same for all embodiments of the invention i.e., solid fuel is burnt to form hot coals; the heat generated is stored in heat absorbing material; thereafter food is placed in the container above the hot coals the container being closed to impede ingress of oxygen to the coals; falling juices of the food being cooked is intercepted so that these cooler juices do not cool the hot coals and also prevents burning of the juices such as meat drippings.

The portable oven 204 is provided with a handle 239.

While the form of embodiments described herein constitute preferred forms respectively, it is to be understood that other forms may be adopted falling within the scope of the claims that follow.

I claim:
1. A combination including:
   (A) an oven including:
      (1) a container embodying:
         (a) encompassing side walls for surrounding a food area above an area for the solid fuel,
         (b) a cover for the side walls,
         (c) a juice intercepting pan disposed above the solid fuel area for defining the lower portion of the food area and for preventing juices from the food from falling into the burning fuel;
   (B) and heat absorbing material surrounding the oven.
2. A combination as defined in claim 1, characterized in that the heat absorbing material is in the form of ground completely encompassing the bottom, side and top of the oven.
3. A combination as defined in claim 1, characterized in that the oven is placed in a dug hole in the ground and covered with ground, the encompassing ground forming the heat absorbing material (B).
4. A combination as defined in claim 1, characterized in that the oven is placed in a dug hole in the ground and covered with ground, the encompassing ground forming the heat absorbing material (B), and further characterized in that the bottom of the container is open.
5. A combination as defined in claim 1, characterized in that the under surface of the cover includes:
   (b)(i) a depending section above the pan for inducing condensation of condensible moisture above the pan.
6. A combination as defined in claim 1, characterized to include:
   (C) a level indicator on the top of the cover.
7. A combination as defined in claim 1, characterized to include:
   (e) a tray disposed above the pan and having a depending section therebelow for inducing concentration of condensible moisture;
   and further characterized in that the container includes:
   (A)(1)(d) means for supporting the tray over the pan.
8. A combination as defined in claim 1, characterized to include:
   (C) means forming a perforated updraft flue spaced inwardly of the side walls of the container;
   (D) means forming a downdraft flue adjacent a side wall of the container.
9. A combination as defined in claim 1, characterized to include:
   (C) means forming a perforated updraft flue spaced inwardly of the side walls of the container;
   (D) means forming a downdraft flue along the outer side of a side wall of the container.
10. A combination as defined in claim 1, characterized to include:
    (C) means forming a perforated updraft flue spaced inwardly of the side walls of the container;
    (D) means forming a downdraft flue adjacent the inner side wall of the container.
11. A combination as defined in claim 1, characterized to include:
    (C) means forming a perforated updraft flue spaced inwardly of the side walls of the container;
    (D) means forming a downdraft flue adjacent a side wall of the container;
    (E) a removable cover for the downdraft flue.
12. A combination as defined in claim 1, characterized in that the container includes:
    (A)(1)(d) a closed bottom wall forming the bottom of the fuel area,
       (e) encompassing walls extending above the bottom wall and cooperating with the bottom wall to define the fuel area.
       (f) and fins extending outwardly from the last mentioned walls and into the heat absorbing material.
13. A combination as defined in claim 1, characterized in that the container includes:
    (A)(1)(d) a closed bottom wall forming the bottom of the fuel area,
       (e) encompassing walls extending above the bottom wall and cooperating with the bottom wall to define the fuel area, said last mentioned walls being spaced inwardly of the first mentioned encompassing side wall to form an area for heat absorbing material.
14. A combination as defined in claim 13, characterized to include:
    (C) a plurality of vertically extending perforated webs extending inwardly from the encompassing walls (e), the inner ends being bent and which cooperate to form a barrier to limit inward radial movement of the solid fuel and provide a perforated updraft flue, the top of said webs cooperating to form a support for the pan.

15. A combination as defined in claim 1, characterized in that the container includes:
   (A)(1)(d) a closed bottom wall forming the bottom of the fuel area,
      (e) encompassing walls extending above the bottom wall and cooperating with the bottom wall to define the fuel area, said last mentioned walls being spaced inwardly of the first mentioned encompassing side wall to form an area for heat absorbing material,
and further characterized to include:
   (C) means forming a perforated updraft flue spaced inwardly of the second mentioned encompossing walls (A)(1)(e);
   (D) means forming a downdraft flue interposed between the first and second mentioned encompassing walls.

16. A combination defined in claim 15, characterized to include:
   (E) means forming a perforated horizontally extending tunnel connecting the lower end of the downdraft flue with the lower end of the updraft tube.

17. A combination as defined in claim 16, characterized to include:
   (F) a hinge connecting the tunnel with the encompassing wall (B)(1)(e).

18. A combination as defined in claim 15, characterized in that the container (A) is in the form of a liner, and further characterized to include:
   (E) a casing spaced from the encompassing walls (A)(1)(a) of the liner and surrounding the said encompassing wall;
and further characterized in that heat absorbing material (B) is disposed between the liner and casing.

19. A combination as defined in claim 15, characterized to include:
   (E) a removable plate carried by the top of the encompassing walls (A)(1)(e), said plate having an opening vertically aligned with the updraft tube, and being removable;
   (F) an updraft flue aligned with the opening in the plate and removable therewith.

References Cited

UNITED STATES PATENTS

| | | | |
|---|---|---|---|
| 1,660,226 | 2/1928 | Heffner | 99—347 |
| 3,224,357 | 12/1965 | Rubens | 99—446 XR |
| 3,286,620 | 11/1966 | Brown | 99—446 |
| 3,299,800 | 1/1967 | Angelo | 99—446 XR |

WALTER A. SCHEEL, Primary Examiner

J. M. BELL, Assistant Examiner

U.S. Cl. X.R.

99—446, 447, 448; 126—15, 25, 273.5